United States Patent
Koppl et al.

[11] 3,713,704
[45] Jan. 30, 1973

[54] BRAKE CONTROL SYSTEM WITH SKID CONTROL

[75] Inventors: Ernest R. Koppl, South Euclid; Harold R. Scibbe, Chardon, all of Ohio

[73] Assignee: TRW Inc., Cleveland, Ohio

[22] Filed: July 27, 1970

[21] Appl. No.: 58,535

[52] U.S. Cl............303/21 B, 188/181 C, 303/21 BE, 303/21 F
[51] Int. Cl................................................B60t 8/08
[58] Field of Search....188/181 C; 303/20, 21; 317/5; 318/52, 326, 328; 324/161; 340/263, 268

[56] References Cited

UNITED STATES PATENTS

| | | | |
|---|---|---|---|
| 3,586,387 | 6/1971 | Riordan et al. | 303/21 BE UX |
| 3,622,208 | 11/1971 | Krugler, Jr. | 303/21 BE |
| 3,498,682 | 3/1970 | Mueller et al. | 303/21 BE |
| 3,401,984 | 9/1968 | Williams et al. | 303/21 BE |
| 3,515,439 | 6/1970 | Lemieux et al. | 303/21 B |
| 3,224,278 | 12/1965 | Reid et al. | 303/21 B |
| 3,365,244 | 1/1968 | Mueller | 303/21 BB |
| 3,467,443 | 9/1969 | Okamoto et al. | 303/21 BE |

Primary Examiner—Milton Buchler
Assistant Examiner—Stephen G. Kunin
Attorney—Hill, Sherman, Meroni, Gross & Simpson

[57] ABSTRACT

Wheel velocity is monitored and at the onset of brake application, the system commits wheel velocity signal to memory as a vehicle velocity signal. During brake application, the wheel velocity signal is scaled to appear a fractional part greater than it actually is. As braking lowers actual wheel velocity to a fixed fraction of that remembered vehicle velocity, the upward biased wheel signal will equal the remembered signal. This equality means that the wheel is at a fixed fraction of vehicle speed, hence at a fixed wheel slip percentage. Thereafter, error in the signal balance or equality is used to adjust a modulating device which raises or lowers braking torque to remove or minimize that error. Such modulation of the braking torque adjusts the wheel speed to maintain a fixed proportionality to vehicle speed. By integrating the motion of an inertial mass in the system, vehicle velocity is constantly updated throughout the vehicle deceleration.

7 Claims, 3 Drawing Figures

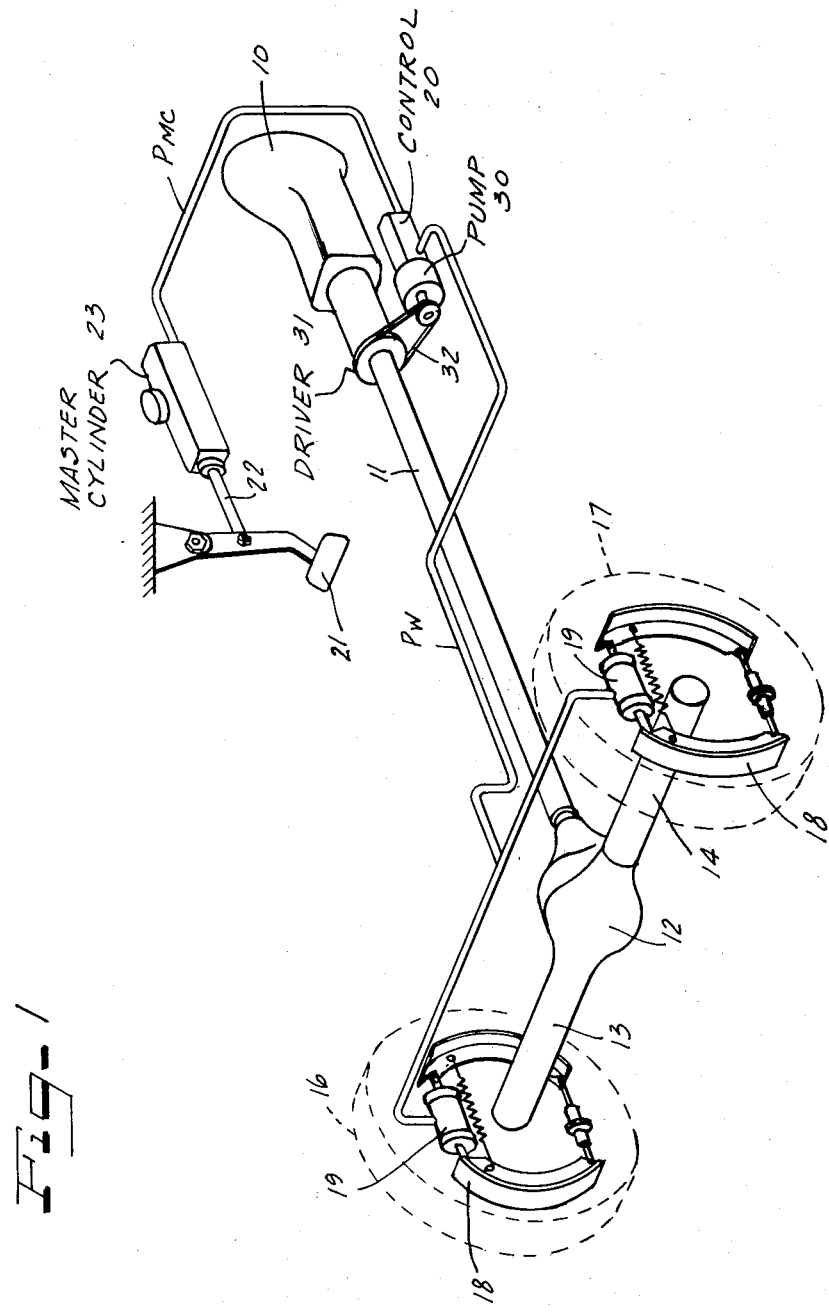

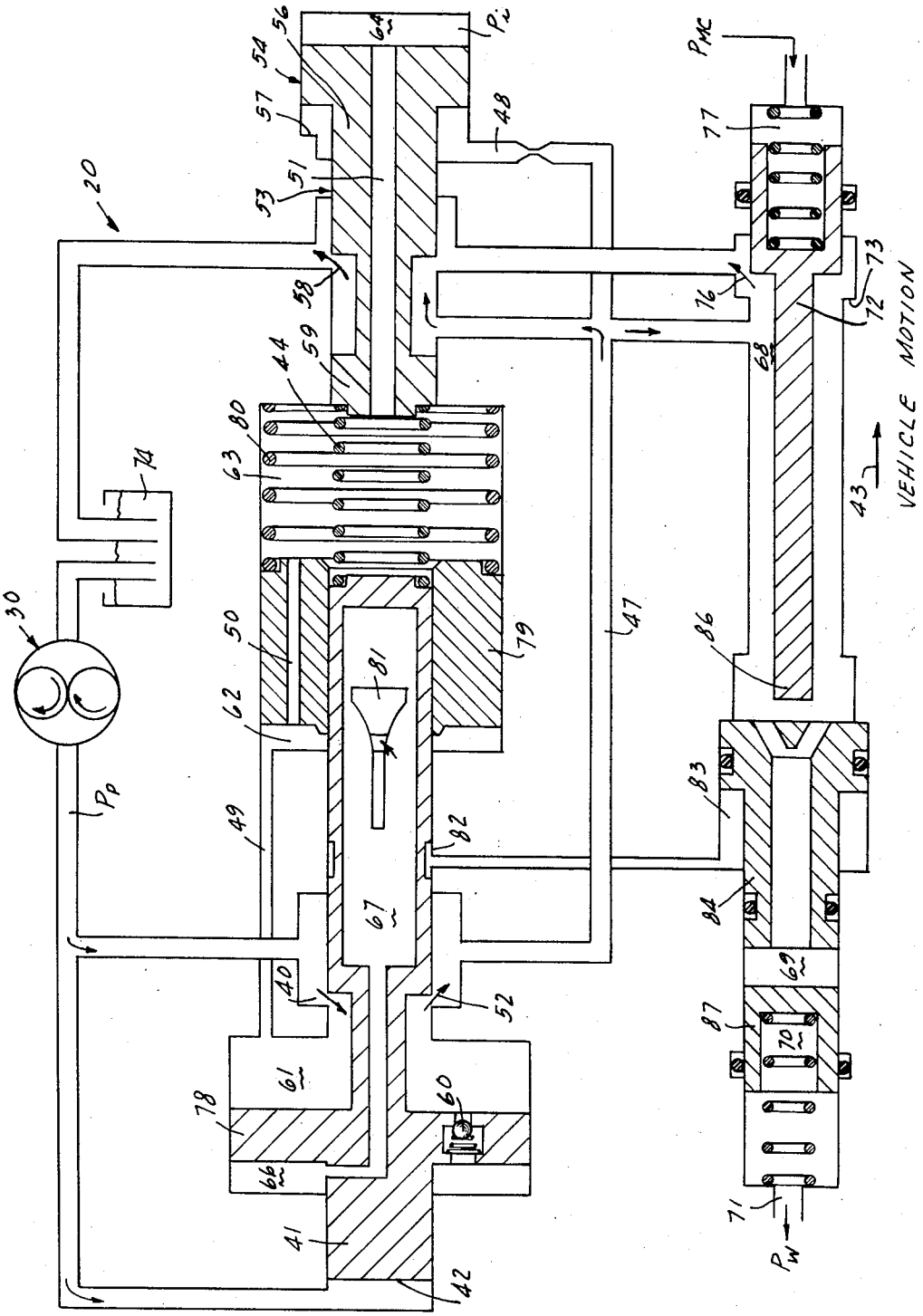

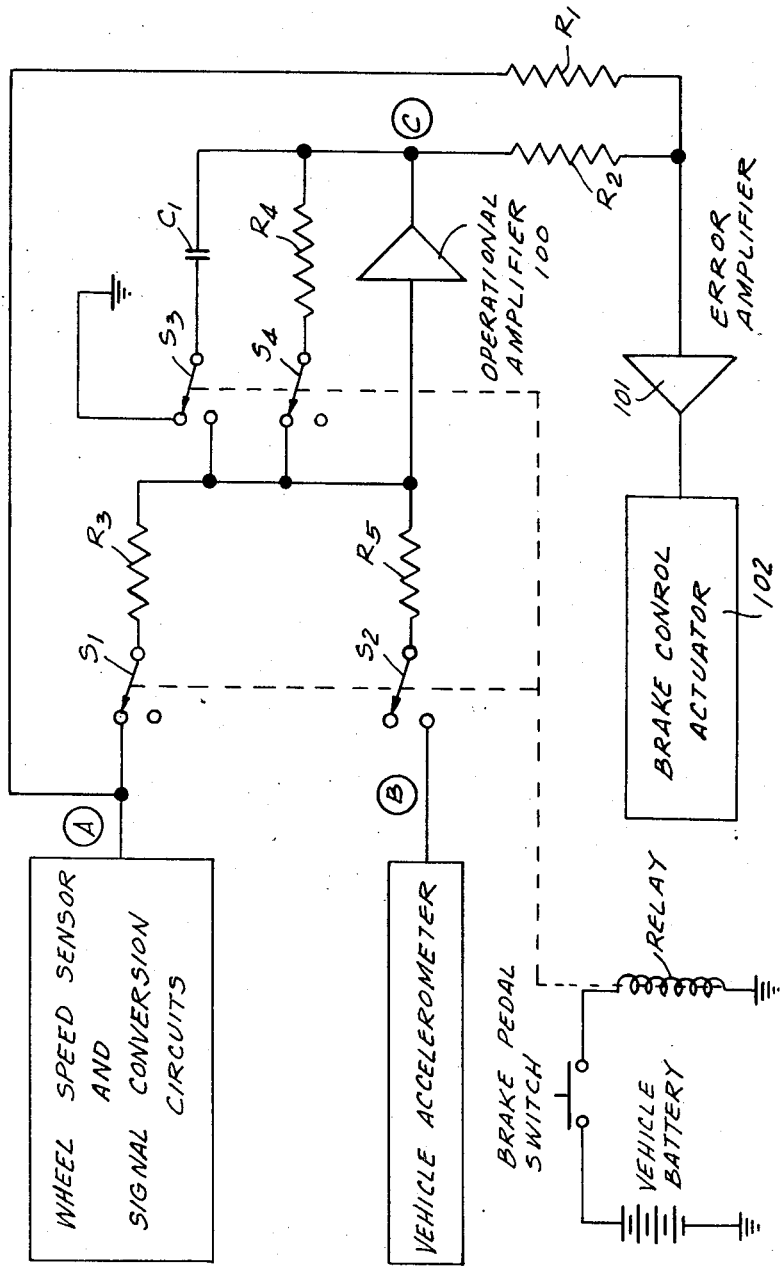

3,713,704

BRAKE CONTROL SYSTEM WITH SKID CONTROL

BACKGROUND OF THE INVENTION

1. Field of the Invention

This invention relates generally to braking systems for wheeled vehicles and more particularly to such a braking system with skid control.

2. The Prior Art

In prior art arrangements heretofore provided various means have been included in braking systems in order to insure wheel slippage. One approach frequently taken is to provide a complicated and expensive electronic control system wherein braking effort is modulated under the control of an electronic regulator. Such systems frequently result in the cyclic application of braking effort. The deceleration of the vehicle is correspondingly cyclic in character, thereby contributing to the discomfort of the rider.

SUMMARY OF THE INVENTION

In accordance with the principles of the present invention, a vehicle braking system is provided based on the concept that vehicle retarding force, generated at the wheel-road interface, is maximized when a finite velocity difference is maintained between the wheel contact area and the roadway. Furthermore, optimum frictional co-efficient for braking is obtained within a nominal wheel slip range. Such wheel slip is normally expressed as the ratio of the velocity difference to vehicle velocity. In this braking concept, the system monitors wheel velocity directly, computes vehicle velocity, and modulates brake pressure to maintain a specific value of wheel slip. Execution of this concept is appropriate for the variety of roadway frictional co-efficients normally encountered. The several components of the system are in operational motion during every brake application. Braking control is retained by the vehicle operator unless excessive brake pressure causes wheel slip to depart from the range associated with optimum frictional coefficient.

In its broadest scope, it is contemplated that the system will commit a wheel velocity signal to memory as a vehicle velocity signal. While the brake is applied, the wheel velocity signal is scaled to appear a fractional part greater than it actually is. Then as braking lowers actual wheel velocity to a fixed fraction of that remembered vehicle velocity, the upward biased wheel signal will equal the remembered signal. This equality means that the wheel is now at a fixed fraction of vehicle speed, hence at a fixed wheel slip percentage.

Thereafter, error in the signal balance or equality is used to adjust a modulating device which raises or lowers braking torque to remove or minimize that error. Such modulation of the braking torque adjusts the wheel speed to maintain a fixed proportionality to the vehicle speed.

The basic concept can be interpreted electronically by sensing and translating wheel rotation to produce a voltage which is proportional to wheel speed. When the brakes are applied, a relay is energized to disconnect an operational amplifier from a wheel speed signal and to reconfigure the operational amplifier, thereby producing a voltage which is the negative of the voltage representing vehicle velocity prior to braking as obtained from the wheel sensor.

During braking, the vehicle deceleration is sensed by a chassis mounted linear accelerometer and presented as a voltage. This signal is integrated by the operational amplifier to produce a signal which represents vehicle velocity, having started at the value derived from the wheel sensor when the wheel was rolling freely prior to braking. The signal is then continuously reduced through braking by the time-integral of deceleration.

The wheel speed signal and the vehicle velocity signal are scaled and added to produce an input to an error amplifier. Since the one signal is of an opposite polarity to the other, the addition actually corresponds to the subtraction of the scaled values of vehicle and wheel speed. The output of the error amplifier, which represents the deviation of actual wheel slip from design slip is used to control a brake control actuator which adjusts braking effort to make actual slip equal to the design wheel slip.

In another interpretation of the same basic concept wherein the entire method and means constitutes a hydraulic arrangement, instantaneous wheel speed is controlled by wheel cylinder pressure to be a constant fraction of vehicle speed. This is accomplished by porting the flow from a wheel-driven pump through two orifices in series, the first orifice being larger than the second. Prior to braking, pressure drop across the first orifice is converted to spring load by a piston. During braking, the same spring load is compared to pressure drop across a second, smaller orifice, by a control valve. The control valve action will increase brake pressure, slowing the wheels and the pump, until the pressure drop caused by the reduced flow through the smaller orifice equates to the spring load. Thus, a continuous closed-loop control action will govern the speed of the braked wheels as they retard the vehicle.

Pump flow is ported through either or both of the two parallel valving elements, a throttle valve actuated by master cylinder pressure, and a control valve responsive to instantaneous wheel speed. In both cases, valve outlet flows are returned to the pump. The wheel-speed responsive valve is normally closed until brake action has slowed the wheels to a preset fraction of free rolling speed, i.e., until the desired wheel slip has been attained. Thereafter, controlled openings and closings of such valve are responsible for brake pressure modulation.

DESCRIPTION OF THE DRAWINGS

FIG. 1 is a somewhat schematic view showing the principles of the present invention as applied to a wheeled vehicle;

FIG. 2 is a plumbing diagram showing the hydraulic circuitry of the control system utilized in the braking system of FIG. 1;

FIG. 3 is a schematic circuit diagram showing an electronic analogue of the brake control system of the present invention.

DESCRIPTION OF THE PREFERRED EMBODIMENTS

Although the principles of the present invention are shown in connection with an application to the rear wheels of a wheeled vehicle, it will be understood that the principles are of general applicability and could be applied to all four wheels of a typical passenger automobile.

Referring to FIG. 1 there is shown the vehicular wheel drive of a typical motor vehicle such as a passenger car or truck. The apparatus includes a transmission 10 driving a propeller shaft 11 through a differential 12 connected by way of the axles 13 and 14 to rear wheels shown at 16 and 17, respectively. The wheels 16 and 17 have a wheel-road interface with a road surface.

Although various types of brakes may be provided including disk brakes or other forms of deceleration means, the present invention is shown illustrated in connection with brakes utilizing shoes 18 actuated by a brake actuator shown at 19 receiving fluid at hydraulic pressure through a conduit labeled $P_w$ connected to a control 20. An actuator pedal 21 is operated by the driver of the vehicle and through an appropriate linkage 22 operates a master cylinder 23, thereby generating a pressure which is conducted through a conduit labeled $P_{mc}$ which also leads to the control 20. There is also shown a pump 30 which is rotatably driven by a driver 31 connected to the propeller shaft 11 by means of a drive belt 32, thereby to rotatably drive the pump 30 as a function of the rotational speed of the wheels 16 and 17.

Referring now to FIG. 2, the control assembly 20 is illustrated in the form of a simplified plumbing diagram. The pump 30 previously referred to in connection with FIG. 1 is a hydraulic pressure pump driven at a speed proportional to wheel speed so that flow delivery is a direct function of such speed irrespective of the pressure level maintained.

The control assembly includes two speed sensitive valves and an inertial mass, and means to circumvent such control when it is incapable of maintaining adequate pressure, to retain vehicle braking.

A pressure output to the wheel brake cylinders is that shown previously in FIG. 1 as $P_w$ and the input pressure from the driver actuated master brake cylinder is shown at $P_{mc}$.

Referring to the plumbing diagram of FIG. 2, whenever the vehicle is in motion, flow from the wheel-driven pump 30 is directed through a first orifice 40 at a piston element 41, thereby creating a pressure differential which is felt by a piston area 42.

In a manner analogous to a speedometer, the piston element 41 moves to the right, using the directional orientation of FIG. 2, in the same direction as the forward vehicle motion indicated by an arrow 43, thereby compressing a spring 44 as the pump and wheel speed increase. Thus, the compressed spring load is the stored equivalent of free rolling wheel speed, and hence of vehicle speed.

The controller 20 is provided with a plurality of passages 47, 48, 49, 50 and 51, which are utilized so that pump flow through a second, smaller orifice 52, establishes a pressure differential across an annular area 53–54 on a valving element 56.

Prior to braking, the pressure differential on the annular area 53–54 is sufficiently large to urge the valve 56 against its limiting stop 57, thereby closing a flow passage 58 and to sustain the compression load of the spring 44 on an extension 59 of the valve 56. Prior to braking, the areas 42 and in the vicinity of the orifice 40, are subjected to pump pressure $P_p$.

By virtue of a non-return valve 60, areas of the controller designated at 61, 62, 63 and 64 and also 66 and 67 are subjected to an intermediate pressure $P_i$.

Areas designated at 47, 48, 68, 69 and 70, as well as a port 71 to the wheel cylinders are subjected to the pressure $P_w$. At this time, the pressure $P_w$ is quite small, sufficient only to hold a throttle valve 72 away from a seat 73 to permit return of pump flow to sump 74.

As the throttle valve 72 throttles return flow through a port 76 in response to driver input of master cylinder pressure $P_{mc}$ on an area 77, the pressures $P_p$, $P_i$ and $P_w$ rise proportionately.

The increasing $P_w$, acting in the wheel cylinders to produce brake torque, initiates wheel deceleration and a reduction of pump speed and flow.

It is necessary to decouple the initial speed setting mechanism, after braking effort has begun, because the equivalent speed spring compression was derived from pump flow at free rolling wheel speed and wheel speed ceases to measure vehicle speed as wheel slip begins. Accordingly, a larger diameter extension 78 on the piston element 41 and in conjunction with the check valve 60, hydraulically locks the spring compression as the wheel deceleration begins. The reduction in pump flow through the first orifice 40 no longer directly controls motion of the piston element 41.

After a fractional reduction in pump flow, representing the predetermined wheel slip, the pressure differential from the second orifice 52 acting on the annular area 53-54 of the valve 56 will just sustain the spring compression. Thus, the locked spring load automatically becomes the correct command for braked wheel speed with the desired fractional wheel slip. Should continued wheel deceleration result in excessive wheel slip, the further reduction of pump flow will reduce the pressure differential sustaining the spring compression, and the valve 56 will move to open the port 58 and prevent further rise of the pressure $P_w$ and further reduction of the instantaneous wheel speed. Thus, the valve 56 continues to modulate brake pressure $P_w$ to maintain a pump flow and pressure differential to sustain the spring compression. The fractional reduction in instantaneous wheel speed, at the time of the port 58 opening, is equivalent to the ratio of flow areas established in the first and second orifices 40 and 52. Orifice 45 serves to limit oscillatory motion of valve 56, thereby providing the damping necessary for system stability.

Since the effect of wheel braking reduces vehicle speed, it is apparent that if the spring compression speed command were to remain unchanged, vehicle speed would decrease only to that of the controlled wheel speed. This is prevented by utilizing an inertial mass 79 to control subsequent leftward motion of the piston element 41 so that the speed command is reduced at a rate proportional to vehicle deceleration. Motion of the inertial mass 79 against a spring 80 uncovers a flow area of a shaped port 81 to relieve the hydraulic lock of the area 66 into the area 62. Now able to respond to the pressure differential on areas 42 and 78, the piston element 41 moves to the left as vehicle speed is reduced.

In this combination, the larger piston 78 integrates flow through the shaped port to find the equivalent speed decrement for the current vehicle deceleration rate. In this way, spring load is continuously modified to reflect actual vehicle speed while being used to control wheel speed.

Since the pump is incapable of generated pressure as the wheels come to a stop, brake control must eventually revert to the master cylinder. A port 82 is provided for this purpose and is located for communication with the second orifice 52 as the piston 41 is positioned equivalent to a low wheel speed. When such low pump speed can no longer generate the required braking pressure $P_w$, the area shown at 83 is vented through the port 82 into the passage 47, and the piston 84 will be mechanically pushed by the extension 86 of the throttle valve 72 against a buffer piston 87 to maintain brake pressure in the area 70, and to the wheel cylinders 19, 19.

A practical difficulty would exist if the two orifices 40 and 52 were fixed in size. For the system to function over a large vehicle speed range, but with a minimal pressure differential range, these orifices are designed as unequal width slots in the bore retaining piston 41 and are uncovered in length by the piston displacement. As the vehicle speed increases, both orifices 40 and 52 increase in size while maintaining a fixed ratio of flow areas.

In basic concept, the structure thus provided monitors wheel velocity and at the onset of brake application, the system commits the wheel velocity signal to memory as a vehicle velocity signal. While the brake is applied, the wheel velocity signal is scaled to appear a fractional part greater than it actually is. Then as braking lowers actual wheel velocity to a fixed fraction of that remembered vehicle velocity, the upward biased wheel signal will equal the remembered signal. This equality means that the wheel is now at a fixed fraction of vehicle speed, hence at a fixed wheel slip percentage. Thereafter, error in the signal balance or equality is used to adjust a modulating device which raises or lowers braking torque to remove or minimize that error. Such modulation of the braking torque adjusts the wheel speed to maintain a fixed proportionality to vehicle speed. By integrating the motion of the interial mass in the system, vehicle velocity is constantly updated throughout the vehicle deceleration.

By way of summary, it will be noted that the throttle valve 72 serves as a pump flow by-pass around the normally closed control valve prior to master cylinder 23 pressure rise. It thus prevents brake pressure rise during non-braking wheel rotation. Under normal low slip braking conditions, the throttle valve 72 throttles pump return flow in response to master cylinder pressure so that pump and wheel cylinder pressures are substantially equal to master cylinder pressure.

When such pressures result in excessive wheel slip, the wheel-speed responsive valve action begins. Should master cylinder pressure continue to rise, due to driver input, the throttle valve by-pass port 76 closes completely and transfers brake control to the wheel-speed sensitive valve.

In order to maintain a constant ratio of wheel-to-vehicle speed as vehicle speed decreases, the spring load is reduced in accordance with vehicle deceleration. This is accomplished by venting the hydraulically locked piston 41, the same piston 41 that first retained the spring load of the spring 44, through the orifice 81 whose flow area is the function of the inertial mass 79 reacting against the spring 80. Thus, instantaneous vehicle speed, throughout the braking period is computed by the integration of linear vehicle deceleration with respect to time. Inherent non-linearities of the system are accommodated by the variable shape of the orifice 81.

Control circuit pressure is transferred to the wheel cylinder circuit by the buffer piston 87 which isolates one fluid circuit from the other. To prevent loss of braking capability due to failure in the control circuit, extended motion of the driver actuated throttle valve 72 can mechanically push the buffer piston 87 to generate pressure at the wheel cylinders 19, 19.

It should be noted that the pressure areas on the throttle valve 72 and on the buffer piston 87 may be pre-selected to afford a desired mechanical advantage, thereby to boost wheel cylinder pressure hydraulically with respect to master cylinder pressure. It is also possible that such relative areas may be selected to reduce wheel cylinder pressure, for example, if a system were desired wherein pressure to one set of wheels might be supplied at a different pressure than to another set of wheels.

That basic system can also be interpreted by an electronic analogue of the hydraulic version illustrated in FIGS. 1 and 2.

Referring now to FIG. 3, it will be noted that wheel rotation is sensed and translated by the sensor and conversion circuits to produce a voltage at A which is proportional to wheel speed. While the brakes are not applied, the deenergized relay (dashed lines) connects $R_3$ and $R_4$ as signal and feedback resistors to the operational amplifier 100 so as to form a voltage invertor, and charges the capacitor $C_1$ to the negative of the voltage at A.

When the brakes are applied, the relay is energized to disconnect the operational amplifier 100 from the wheel speed signal and re-configure the operational amplifier 100 with the capacitor $C_1$ and the resistor $R_5$ as an integrator. The voltage previously stored on the capacitor $C_1$ becomes the initial output of the integrator. This voltage is the negative of the voltage representing vehicle velocity prior to braking as obtained from the wheel sensor.

During braking the vehicle deceleration (not the wheel deceleration) is sensed by a chassis mounted linear accelerometer identified by legend and shown schematically and is presented as a voltage at B. This signal is integrated by the operational amplifier 100 to produce a signal at C which represents vehicle velocity, having started at the value derived from the wheel sensor when the wheel was rolling freely prior to braking. The signal at C is then continuously reduced through braking by the time-integral of deceleration.

The signals at A and C are scaled and added by $R_1$ and $R_2$ to produce the input to the error amplifier. It will be remembered that C is of opposite polarity to A and hence this addition actually corresponds to the subtraction of the scaled values of vehicle and wheel speed. The values of $R_1$ and $R_2$ are chosen so as to produce zero error signal when the measured wheel speed is less than the calculated vehicle speed by a specific fraction known as the design slip.

The output of the error amplifier, shown at 101, which represents the deviation of actual wheel slip from design slip, is used to control a brake control actuator 102 which adjusts braking effort to make actual slip equal to the design wheel slip.

There is thus provided in the two versions of the braking concept herein disclosed, a system which monitors wheel velocity directly, computes vehicle velocity, and modulates brake pressure to maintain a specific value of wheel slip.

We claim as our invention:

1. The method of braking a vehicle so that by integrating the motion of an inertial mass in the system vehicle velocity is constantly updated throughout vehicle deceleration and which method includes the steps of
   a. monitoring wheel velocity whenever the wheels of the vehicle are rotating by driving a supply of fluid through a circuit in the form of a stream as a function of vehicle speed,
   b. at the onset of a braking application committing a signal to memory which is a function of the wheel velocity thereby constituting a vehicle velocity signal by converting a pressure drop at one point in said circuit into a spring load,
   c. while the brake is applied during the braking application scaling a continuing wheel velocity signal upwardly to appear a fractional part greater than it actually is by comparing the spring load to a pressure drop at a second point in said circuit by a valving action,
   d. then allowing the scaled-up wheel velocity signal to decrease as braking during the braking application lowers actual wheel velocity to a fixed fraction of the remembered wheel velocity so that the upward biased wheel signal will balance the remembered signal by continuously reducing the remembered signal to correspond to the reducing vehicle velocity by the time integral of vehicle deceleration which reduction is effected by reducing the spring load in accordance with vehicle declaration, whereupon the wheel rotates at a fixed fraction of vehicle speed corresponding to a fixed wheel slip percentage,
   e. effecting continuously integration of vehicle deceleration which constantly updates vehicle velocity,
   f. and adjusting a modulating device as a function of the error in the signal balance by applying braking effort as a function of hydraulic force,
thereby to raise or lower the braking torque to minimize such error and adjusting wheel speed to maintain a fixed proportionality to vehicle speed.

2. A vehicular braking system comprising, means forming a hydraulic circuit,
   a wheel-driven pump in said circuit for driving a supply of liquid in the form of a stream through said circuit as a function of wheel speed,
   first and second orifices in said circuit disposed in series for porting the flow from said pump,
   said first orifice being larger than said second orifice,
   piston means having motive surfaces responsive to the pressure drop across said first orifice,
   spring means engageable with said piston means, whereby the pressure drop across said first orifice is converted to a spring load,
   a control valve in said circuit downstream of said second orifice for comparing the pressure drop across said second smaller orifice to said spring load,
   brake actuating means in said circuit for slowing the wheels, said control valve action increasing brake pressure and slowing the wheels and the pump until the pressure drop caused by flow through said smaller orifice equates to said spring load,
whereby a closed-loop control action will govern the speed of the braked wheels as they retard the vehicle.

3. A hydraulic vehicle braking control system comprising means forming an hydraulic circuit,
   a wheel-driven pump in said circuit for driving a supply of liquid in the form of a stream,
   first and second orifices in series,
   a spring
   and a piston means engageable with said spring and having motive surfaces responsive to the pressure drop across said first orifice so that prior to braking, the pressure drop across said first orifice is converted into a spring load,
   two parallel valving elements in said circuit including a throttle valve actuated by master cylinder pressure and a control valve responsive to instantaneous wheel speed,
   valve outlet flows from both of said valves being returned to said pump,
     said control valve being normally closed until brake action has set the wheels to a pre-set fraction of free rolling speed, i.e., wheel slip, but opening thereafter to effect brake pressure modulation,
     said throttle valve operating as a pump flow by-pass around said normally closed control valve prior to master cylinder pressure rise,
   and venting means for said piston means for reducing the spring load in accordance with vehicle deceleration by maintaining a constant ratio of wheel to vehicle speed as vehicle speed decreases.

4. A hydraulic vehicle braking control system as defined in claim 3 and further characterized by said venting means comprising
   an orifice whose flow area is the function of an inertial mass reacting against a second spring in response to vehicle deceleration,
whereby instantaneous vehicle speed throughout the braking period is computed by the integration of linear vehicle deceleration with respect to time.

5. An hydraulic vehicle braking control system as defined in claim 4 and a buffer piston responsive to control circuit pressure and operative to transfer such pressure to the wheel cylinder circuit of the braking system, said buffer piston being axially aligned with said throttle valve whereby extended motion of the driver-actuated throttle valve can mechanically push the buffer piston to generate pressure at the wheel cylinders.

6. An hydraulic vehicle braking control system as defined in claim 3 and further characterized by said throttle valve throttling pump return flow in response to master cylinder pressure under normal low slip braking so that the pump and wheel cylinder pressures are substantially equal to master cylinder pressure, or some ratio thereof,
   said throttle valve operating to close the by-pass port completely in the event of master cylinder pressure increase due to operator input whereby brake control will be transferred to the wheelspeed sensitive control valve.

7. The method of braking a vehicle so that by integrating the motion of an inertial mass in the system, vehicle velocity is constantly updated throughout vehicle deceleration and which method includes the steps of
   a. monitoring wheel velocity whenever the wheels of the vehicle are rotating by driving a supply of fluid through a circuit in the form of a stream as a function of vehicle speed,
   b. at the onset of a braking application committing a signal to memory which is a function of the wheel velocity thereby constituting a vehicle velocity signal by converting a pressure drop at one point in said circuit into a spring load,
   c. while the brake is applied during the braking application scaling the wheel signal upwardly to appear a fractional part greater than it actually is by comparing the spring load to a pressure drop at a second point in said circuit by a valving action,
   d. then allowing the scaled up wheel signal to decrease as the braking application lowers actual wheel velocity to a fixed fraction of the remembered wheel velocity so that the upward biased wheel signal will balance the remembered signal,
so that the wheel is at a fixed fraction of vehicle speed corresponding to a fixed wheel slip percentage,
   e. continuously reducing the remembered signal to correspond to the reducing vehicle velocity by the time integral of vehicle deceleration by reducing the spring load in accordance with vehicle deceleration,
   f. and adjusting a modulating device as a function of the error in the signal balance by applying braking effort as a function of hydraulic force,
thereby to raise or lower the braking torque to minimize such error and adjusting wheel speed to maintain a fixed proportionality to vehicle speed.

* * * * *